United States Patent [19]

Hara

[11] 4,055,047
[45] Oct. 25, 1977

[54] SAFETY DEVICE FOR HYDRAULICALLY DRIVEN VEHICLES

[75] Inventor: Hideo Hara, Kawasaki, Japan

[73] Assignee: Kabushiki Kaisha Komatsu Seisakusho, Tokyo, Japan

[21] Appl. No.: 709,645

[22] Filed: July 29, 1976

[30] Foreign Application Priority Data

July 29, 1975 Japan .................................. 50-104125

[51] Int. Cl.² ...................... F16H 39/46; F15B 20/00
[52] U.S. Cl. ........................................ 60/444; 60/488;
60/DIG. 2; 180/82 R
[58] Field of Search ........... 60/443, 444, 488, DIG. 2,
60/433; 180/82 R, 82 A, 44 F

[56] References Cited

U.S. PATENT DOCUMENTS 3,365,886  1/1968  Moon ..................................... 60/443

FOREIGN PATENT DOCUMENTS 1,249,277  11/1960  France .................................. 60/444

Primary Examiner—Edgar W. Geoghegan
Attorney, Agent, or Firm—Armstrong, Nikaido & Marmelstein

[57] ABSTRACT

A safety device for hydraulically driven vehicles including a hydraulic motor for driving the vehicles, a variable displacement pump for supplying fluid to said motor, a servo control mechanism for controlling displacement of said variable displacement pump, an additional pump for supplying fluid to said servo-control mechanism, and a servo valve provided between said additional pump and said servo control mechanism for selectively communicating said servo control mechanism with said additional pump.

Movement of the vehicle is prevented when an engine for driving the pumps is running while a shift control lever is either at forward movement position or backward movement position.

6 Claims, 3 Drawing Figures

SAFETY DEVICE FOR HYDRAULICALLY DRIVEN VEHICLES

BACKGROUND OF THE INVENTION

This invention relates to a safety device for hydraulically driven vehicles having a variable displacement pump and a motor.

Speed of such a vehicle is controlled by varying the displacement of the variable displacement pump which is operated by a control lever.

In such a vehicle, if an engine for driving the variable displacement pump is started while the control lever is either at forward movement position or backward movement position, the vehicle is abruptly caused to run and is therefore very dangerous.

SUMMARY OF THE INVENTION

According to the present invention, there is provided a safety device for hydraulically driven vehicles comprising a hydraulic motor for driving said vehicles, a variable displacement pump for supplying pressurized fluid to said motor, servo control means for conrolling displacement of said variable displacement pump, an additional pump for supplying fluid to said servo control means, control lever means connected to said servo control means for controlling forward and backward movements of said vehicles, servo valve means provided between said additional pump and said servo control means for selectively communicating said servo control means with said additional pump, and switching means connected to said control lever means in response to the operation of said control lever means.

It is, therefore, an object of the present invention to provide a safety device for hydraulically driven vehicles.

It is another object of the present invention to provide a safety device wherein movement of the vehicle is prevented when an engine for driving the pumps is running while a shift control lever is positioned either at a forward movement position or a backward movement position thereof.

Other objects, features and advantages of the present invention will be readily apparent from the following description taken in conjunction with the following drawings.

DETAILED DESCRIPTION OF THE PREFERRED EMBODIMENTS

Figure 1:
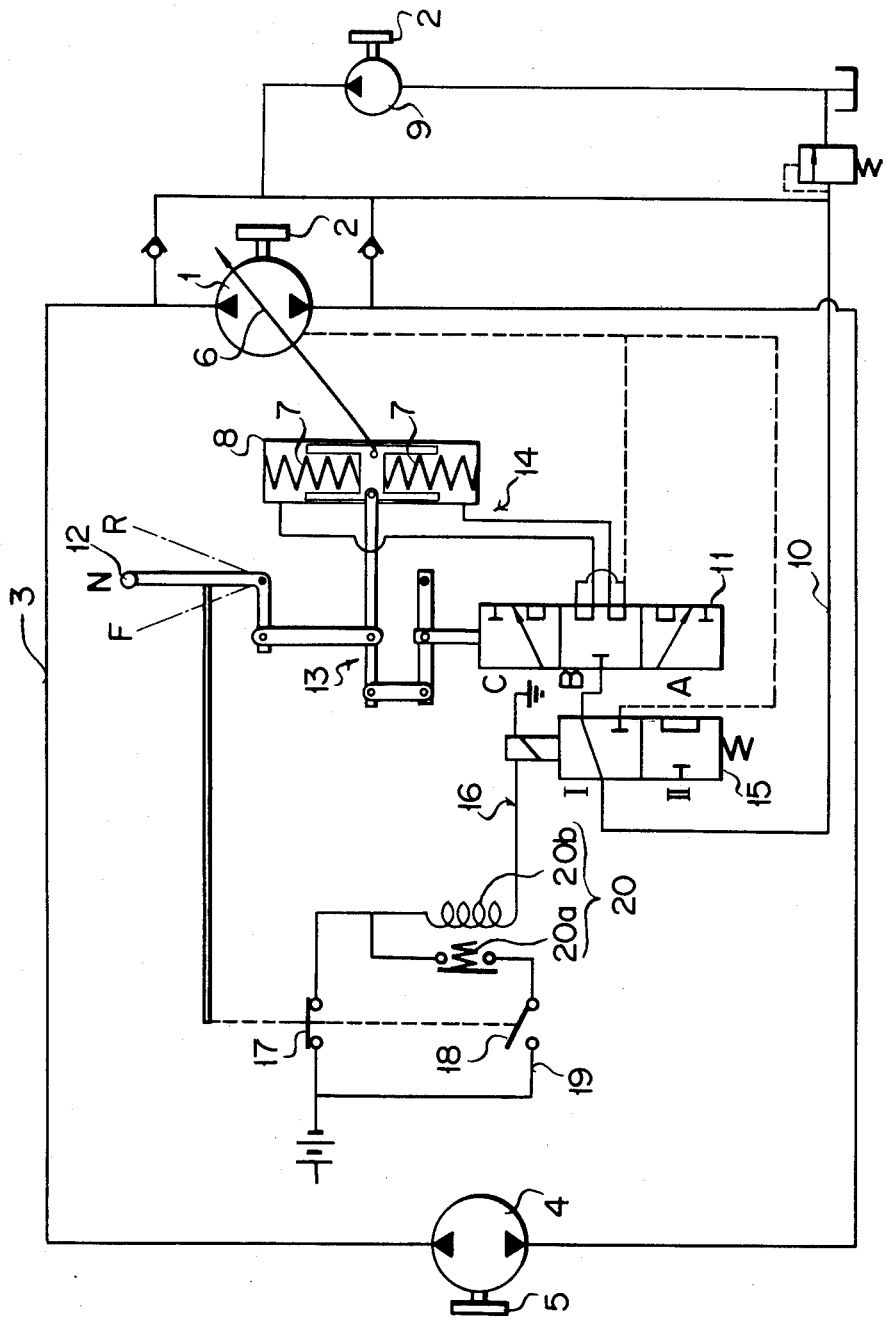
FIG. 1 is an explanatory view of the present invention showing a hydraulic circuit.

A variable displacement pump 1 is driven by an engine 2, and the hydraulic fluid deliverred by the pump is supplied through a main circuit 3 to a hydraulic motor 4 which drives a vehicle through driving wheels and endless belts 5.

The variable displacement pump 1 is adapted to alter the inclination angle of an inclined plate 6 so as to increase or decrease the discharge volume or displacement thereof. The inclined plate 6 is actuated by an actuator 8 adapted to be returned to and held at its neutral position by the resilient forces of springs 7.

Reference numeral 9 denotes a charge pump driven by the engine 2, and the hydraulic fluid delivered thereby is supplied through a servo circuit 10 to a servo valve 11 whose position can be changed by operating a control lever 12. The servo valve 11 is interlocked with the actuator 8 through a link mechanism so that the actuator 8 can be moved to a position corresponding to the amount of movement of the control lever 12 thereby forming a servo control mechanism.

Installed in the servo circuit 10 is a solenoid operated changeover valve 15 which is adapted to occupy communicating or open position I when energized and interrupting or closed position II when deenergized. The solenoid operated change-over valve 15 is connected with a main electric circuit 16 for energization thereof through a first switch 17. The first switch 17 is connected with a bypass curcuit 19 having a second switch 18. The bypass cirucit 19 further includes a contact 20a of a self-holding switch 20 connected in series therewith, and the main electric circuit 16 includes a coil 20b of the self-holding switch 20 connnected in series therewith.

The above-mentioned first switch 17 and the second switch 18 are adapted to turn on and off by the operation of the control lever 12. When the control lever 12 is located near the neutral position, the first switch 17 is turned on and the second switch 18 is turned off. Whilst, when the control lever 12 is located at either forward movement position F or reversing position R, the first switch 17 is turned off, whilst the second switch 18 is turned on.

The operation of the present invention will now be described in detail hereinbelow.

When the control lever 12 is located at neutral position N, the actuator 8 is returned to its neutral position by the resilient forces of the springs 7. As a result, the inclination angle of the inclined plate 6 becomes zero and the pump 1 is not permitted to deliver hydraulic fluid so that the motor 4 is deenergized and the vehicle becomes unable to run.

If and when the engine 2 is started under this condition, because of the first switch 17 being shifted at "ON" position, the solenoid operated change-over valve 15 is energized so as to occupy the communicating position I and the servo circuit 10 communicates with the charge pump 9. As a result, servo fluid under pressure is supplied to the input of servo control valve 11, so that the operation of the control lever 12 to either the forward movement position F or the reversing position R enables the vehicle to run. Even when the control lever 12 is located at either the forward movement position F or the reversing position R, the solenoid operated change-over valve 15 is still energized, because the contact 20a of the self-holding switch 20 is positioned at its "ON" position.

Further, if the engine 2 is started while the control lever 12 is located at the forward movement position F, because the first switch 17 is turned off and the second switch 18 is turned on, the contact 20a of the self-holding switch 20 is turned off so that no electric current flows through the main electric circuit 16 and the solenoid operated change-over valve 15 becomes deenergized to occupy the interrupting position II. As a result, servo fluid under pressure is not supplied to the inlet servo control valve 11 so that, even if the control lever 12 is moved to either the forward movement position F or the reversing position R, the inclination of the inclined plate 6 cannot be altered, and therefore it becomes impossible for the driver to run the vehicle.

Thus, even if the engine 2 is started while the control lever 12 is located at either the forward movement position F or the reversing position R, the vehicle can not run.

Figure 2:
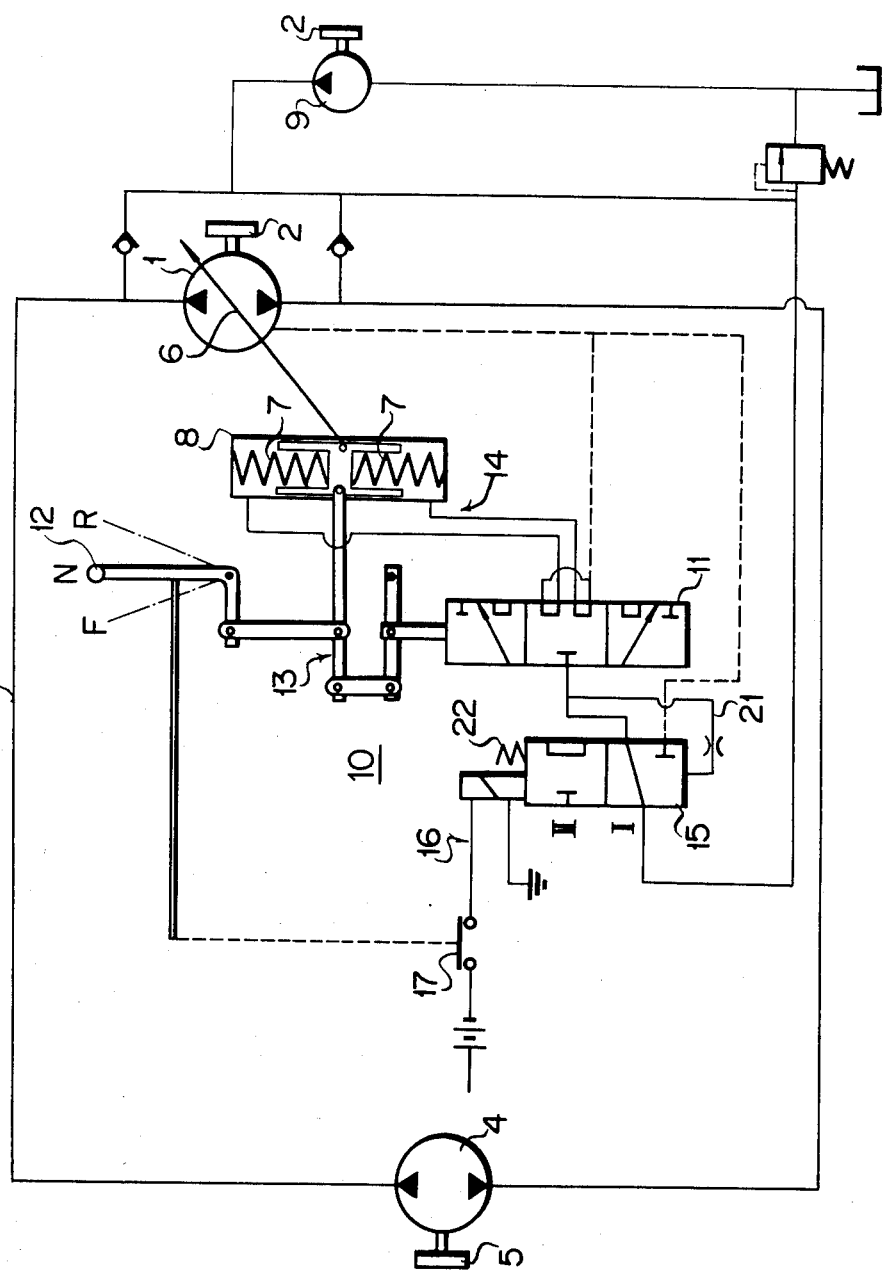
FIG. 2 is similar to FIG. 1 but showing another embodiment of the present invention.

FIG. 2 shows another embodiment of the present invention which differs from the embodiment of FIG. 1 in that the electromagnetic or solenoid operated valve 15 includes a self-holding pilot circuit 21. If the engine 2 is started while the control lever 12 is located at its neutral position, the switch 17 is turned on so that the solenoid operated change-over valve 15 is energized to occupy communicating position I which permits the servo circuit 10 to communicate with the charge pump 9 and thereby supplying servo fluid pressure to the servo control mechanism. Movement of the control lever 12 to either the forward movement position F or the reversing position R opens the switch 17 but the solenoid operated valve continues to keep its "ON" state due to the self-holding pilot circuit 21 acting against the resilient force of a spring 22. Therefore, the solenoid valve 15 remains at a position to communicate with the servo circuit and the angle of the inclined plate 6 of the variable displacement pump 1 can be varied so as to supply hydraulic pressure corresponding to the amount of movement of the control lever 12 to the hydraulic motor 4 so that the vehicle can move forward or backward.

When the engine 2 is started while the control lever 12 is located at the forward movement position F, the solenoid operated valve 15 is returned to "OFF" position by the force of the spring 22 because before the engine start the fluid pressure in the pilot circuit 21 of the solenoid operated valve 15 is released. Since the switch 17 is turned off while the control lever 12 is located at the forward movement position F, no electric current flows through the main electric circuit 16 so that the solenoid operated valve 15 becomes deenergized to occupy the interrupting position II. As a result, the servo circuit 10 is disconnected from the solenoid valve 15 and servo fluid under pressure is not supplied to the servo control mechanism 14 so that the angle of the inclined plate 6 of the variable displacement pump 1 can not vary and therefore the vehicle can not move forward.

Since the solenoid operated valve 15 can be turned on by returning the control lever 12 to the neutral position, subsequent movement of the control lever 12 over to the forward movement position enables the vehicle to move forward.

Figure 3:
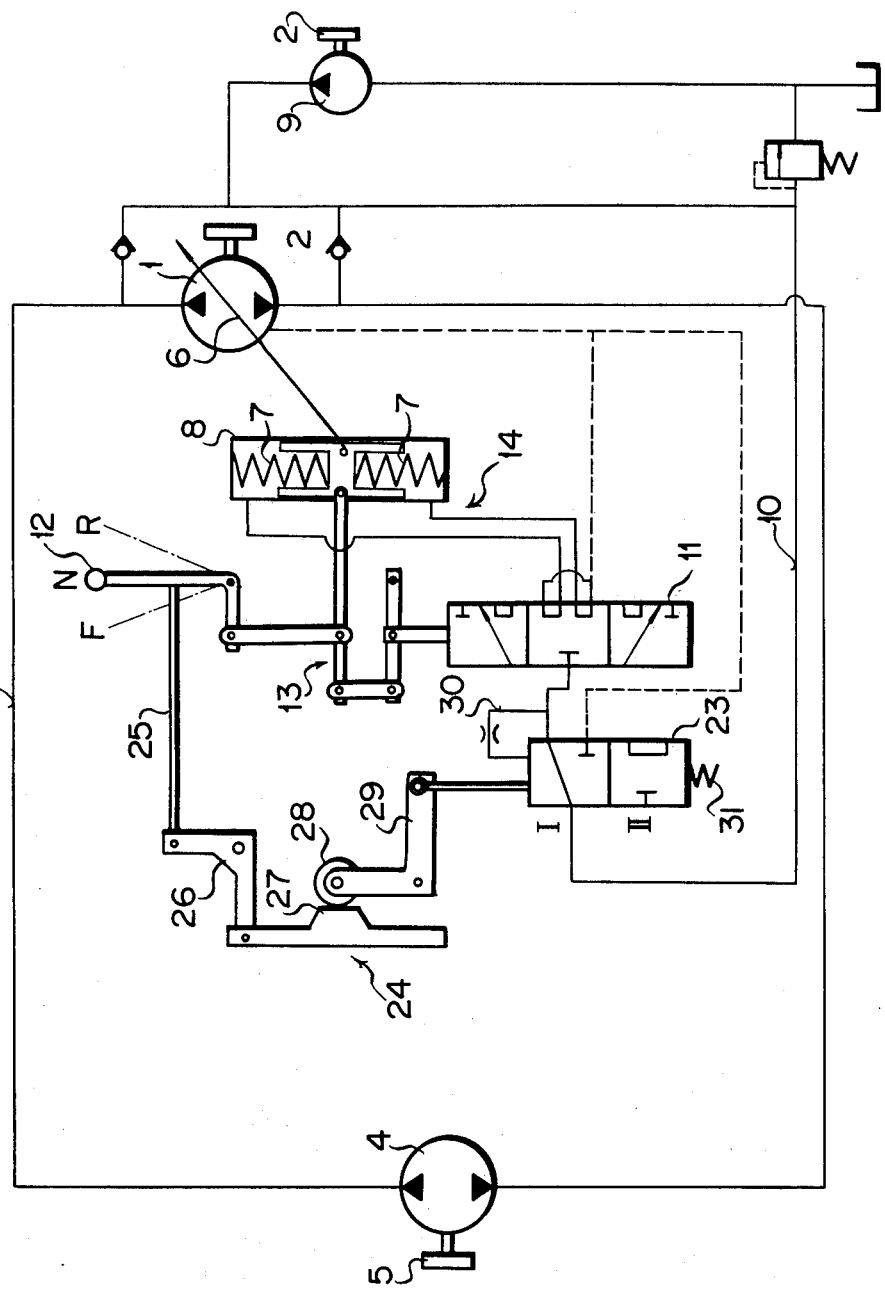
FIG. 3 is similar to FIG. 1 but showing still another embodiment of the present invention.

FIG. 3 illustrates still another embodiment of the present invention which differs from the embodiments of FIGS. 1 and 2 in that a cam actuated valve 23 is employed in place of the solenoid operated valve 15, and the electric switching mechanism is replaced by a cam mechanism 24. A control lever 12 is coupled through a rod 25 and a link 26 to the cam mechanism 24. The cam mechanism 24 comprises a cam 27 and a roller 28 which is connected to a link 29 adapted to move up and down to turn the valve 23 on and off. The cam mechanism 24 is arranged such that the cam actuated valve 23 can occupy its "ON" position when the control lever 12 is located at the neutral position thereof. If the engine 2 is started while the control lever 12 is located at the neutral position thereof, the cam actuated valve 23 occupies its communicating position I and the servo ciruclit 10 communicates with the charge pump 9 and thereby fluid under pressure is supplied to the input of servo valve 11. When the control lever 12 is moved to either forward movement position or reversing position, the cam 27 is moved. However, the cam actuated valve 23 continues to keep its "ON" state by the action of a self-holding pilot circuit 30 against the biasing force of a spring 31. Therefore, the roller 28 can not follow the movement of the cam 27 and remains at the position as shown in FIG. 3. Thus, when the control lever 12 is moved from the neutral position to the forward position, the servo circuit remains in communication with the cam actuated valve 23 so that the angle of the inclined plate 6 of the variable displacement pump 1 can vary and fluid pressure corresponding to the amount of movement of the control lever 12 is supplied to the hydraulic motor 4 thereby moving the vehicle forward.

When the engine 2 is started while the control lever 12 is located at the forward movement position, the valve 23 is returned to "OFF" position by the force of the spring 23 because fluid pressure in the pilot circuit 30 is released before the engine is started. When the control lever 12 is located at the neutral position thereof, the cam actuated valve 23 occupies its "ON" position. Whilst, the control lever 12 is located at either the forward movement position or the reversing position, the cam actuated valve 23 occupies its "OFF" position. Therefore, the valve 23 occupies its interrupting or disconnecting position II and the servo circuit is disconnected from the cam actuated valve 23 so that servo fluid pressure is not supplied to the servo control mechanism 14 and the angle of the inclined plate 6 of the variable displacement pump 1 can not change thus making the vehicle unable to move forward.

Since the cam actuated valve 23 can be moved to the "ON" position thereof by returning the control lever 12 to the neutral position, subsequent movement of the control lever 12 to the forward movement position enables the vehicle to move forward.

What is claimed is:

1. A safety device for hydraulically driven vehicles comprising a hydraulic motor for driving said vehicles, a variable displacement pump for supplying fluid under pressure to said motor,
   means for controlling displacement of said variable displacement pump,
   an additional pump for supplying fluid under pressure to said means, control lever means connected to said means for controlling forward and backward movements of said vehicles, valve means provided between said additional pump and said means for selectively communicating said means with said additional pump, and switching means connected to said control lever means to selectively open or close said valve means in response to the operation of said control lever means wherein said switching means is turned "ON" when said control lever means is at its neutral position and turned "OFF" when said control lever means is either at forward or backward movement position.

2. The safety device of claim 1 wherein said valve means can be shifted to open position when said control lever means is at its neutral position and remains open even if said control lever means is subsequently shifted to either forward or backward movement position.

3. The safety device of claim 1 wherein said means comprises an actuator connected to said variable displacement pump for controlling the displacement of said pump, linkage connecting said actuator with said control lever means, and a second valve means interconnected with said actuator and said control lever means through said linkage.

4. The saftey device of claim 1 wherein said switch means comprises a first switch adapted to be turned "ON" when said control lever means is at its neutral position, a second switch operates opposite to said first switch, and a self holding switch.

5. The safety device of claim 1 wherein said switch means comprises a cam connected to said control lever means, and a roller connected to said valve means.

6. The safety device of claim 1 wherein said valve means includes a pilot operated hydraulic circuit for holding said valve means open even if said switch means is turned "OFF".

* * * * *